United States Patent [19]

Inaba et al.

[11] Patent Number: 4,580,941

[45] Date of Patent: Apr. 8, 1986

[54] INDUSTRIAL ROBOT HAND-HOLDING DEVICE

[75] Inventors: Hajimu Inaba, Hino; Nobutoshi Torii, Hachioji, both of Japan

[73] Assignee: Fanuc, Ltd., Tokyo, Japan

[21] Appl. No.: 471,268

[22] Filed: Mar. 2, 1983

[30] Foreign Application Priority Data

Mar. 5, 1982 [JP] Japan ................................ 57-033776

[51] Int. Cl.4 ................................................ B66C 1/00
[52] U.S. Cl. ........................................ 414/730; 901/49
[58] Field of Search .................. 414/730, 732; 901/49, 901/30; 248/548; 52/98, 100; 403/2

[56] References Cited

U.S. PATENT DOCUMENTS 3,251,483  5/1966  Devol .............................. 901/49 X
3,521,413  7/1970  Scott et al. ...................... 248/548 X
4,344,729  8/1982  Orsinger et al. ................. 414/730 X

FOREIGN PATENT DOCUMENTS 3025952  2/1982  Fed. Rep. of Germany ... 901/49 X
8202019  6/1982  Japan .................................... 901/49

Primary Examiner—Leslie J. Paperner
Assistant Examiner—Dennis Williamson
Attorney, Agent, or Firm—Armstrong, Nikaido, Marmelstein & Kubovcik

[57] ABSTRACT

An industrial robot hand-holding device having a hand-holding unit attached to the extremity of the robot wrist, a hand-attaching unit having mounted thereon one of a plurality of diverse robot hands and being detachably attached to the hand-holding unit, and a safeguard unit provided between the extremity of the robot wrist and the hand-holding unit so as to safeguard the robot hand against an extraordinary force applied to or acting on the robot hand.

1 Claim, 4 Drawing Figures

INDUSTRIAL ROBOT HAND-HOLDING DEVICE

BACKGROUND OF THE INVENTION

1. Field of the Invention

The present invention relates to an industrial robot hand-holding device and in particular to a hand-holding device of the type having therein a safeguard unit for preventing the robot arm and the robot wrist of the industrial robot, as well as the essential components of the hand-holding device, from being broken.

2. Description of the Prior Art

A conventional industrial robot is provided, at the extremity of the arm or the wrist thereof, with a robot hand which is controlled by a robot control device and is widely used in various industries as a laborsaving device. Particularly, conventional industrial robots are being utilized more and more in combination with a machine tool for carrying a workpiece, for loading and unloading a workpiece, for carrying a workpiece after machining, and for assembling various parts. Recently, there has been provided an interchangeable robot hand type of industrial robot, namely, an industrial robot capable of sequentially executing desired robot task by alternately holding a robot hand, selected from among a plurality of robot hands previously prepared for a specific purpose, at the extremity of the arm and the wrist thereof. Such an interchangeable robot hand type of industrial robot is provided with a hand-holding device at the extremity of the arm or the wrist thereof and is adapted to execute desired robot task by alternately and detachably holding various robot hands by means of the hand-holding device. A previously proposed hand-holding device is provided, at the extremity thereof, with a receiving hole formed in the shape of a tapered hole for receiving an attaching part of a pull stud, formed in a robot hand, in order to hold the robot hand. The hand-holding device, in general, is permanently fixedly connected to the extremity of the robot arm or wrist. In such an interchangeable robot hand type of industrial robot, it is possible that the application to the robot hand of an extraordinary external force, such as an unexpected external force or a shock, resulting from malfunction of the robot during operation or the sudden starting of the robot in response to external noise signals may affect and damage not only the robot hand but also the hand-holding device, the robot arm, and the robot wrist.

SUMMARY OF THE INVENTION

Accordingly, an object of the present invention is to provide a robot hand-holding device having protective means capable of preventing damaging of the hand-holding device, the robot arm, and the robot wrist even if an extraordinary force is applied to the interchangeable robot hand.

The present invention provides an industrial robot hand-holding device capable of detachably and automatically mounting a robot hand on the wrist or the arm of an industrial robot, characterized in that a safeguard unit, which functions in response to an extraordinary force applied to the robot hand, is provided between the extremity of the arm or the wrist and the hand-holding device per se.

BRIEF DESCRIPTION OF THE DRAWINGS

The present invention will be more apparent from the ensuing description made with reference to an embodiment thereof shown in the accompanying drawings, wherein.

DESCRIPTION OF THE PREFERRED EMBODIMENT

Figure 1:
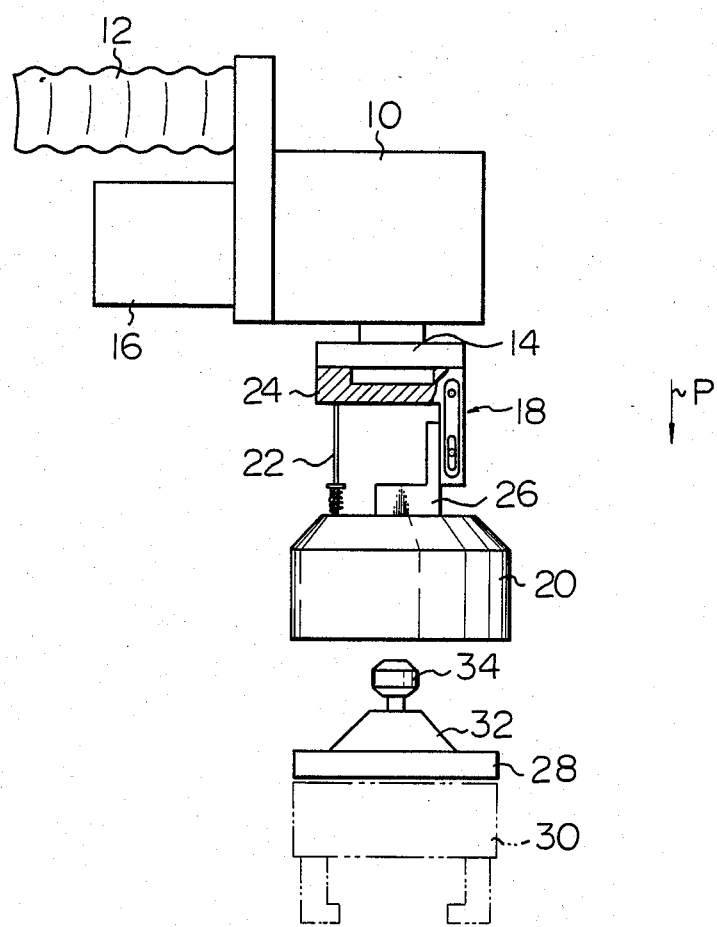
FIG. 1 is a schematic side view illustrating the general construction of an industrial robot hand-holding device according to an embodiment of the present invention.

The present invention is described in more detail hereinafter with reference to an embodiment thereof shown in the accompanying drawings, wherein:

FIG. 1 is a schematic side view of an industrial robot hand-holding device according to the present invention showing the general constitution thereof, in which the hand-holding device is attached to the extremity of the wrist of the industrial robot.

Referring to FIG. 1, a robot wrist 10 of an industrial robot is mounted on the extremity of a robot arm 12. The wrist 10 has at its extremity a rotary output end 14. The rotative driving force of a driving motor 16 is transmitted to the rotary output end 14 through a rotation transmission mechanism, such as a belt and pulley mechanism, provided within the wrist 10. A hand-holding unit 20 of the hand-holding device is connected to the rotary output end 14 by a safeguard unit 18. A lever 22 for detecting an extraordinariness projects from the hand-holding unit 20 and is in contact, at one end thereof, with a safeguard joint 24 of the safeguard unit 18, which is described hereinafter, and is also in contact, at the other end thereof, with a limit switch, which is described hereinafter with reference to FIG. 3, for detecting an extraordinariness within the hand-holding unit 20 so as to keep the limit switch turned on. The safeguard unit 18 has the above-mentioned safeguard joint 24 and an attachment joint 26, both of which are formed as right-angled joint members, respectively. The safeguard joint 24 and the attachment joint 26 are interconnected by a connecting means such as screw means so as to form the integral safeguard unit 18. Alternatively, the safeguard joint 24 and the attachment joint 26 may be formed as one part, if so desired. In the embodiment of FIG. 1, the safeguard joint 24 is connected to the rotary output end 14 while the attachment joint 26 is attached to the upper end of the hand-holding unit 20. A robot hand 30 attached to a hand-attaching unit 28 is shown below the hand-holding unit 20. A tapered portion 32, formed so as to fit into the hand-holding unit 20, and a pull stud 34 are formed in the upper part of the hand-attaching unit 28. In FIG. 1, the robot hand 30 attached to the hand-attaching unit 28 is shown as being separated from the hand-holding unit 20. When the robot hand 30 is placed on a suitable fixed plate and when the arm 12 and the wrist 10 of the industrial robot are moved in the direction of the arrow P, the hand-holding unit 20 and the hand-attaching unit 28 are interconnected so that the robot hand 30 is mounted on the industrial robot. According to the present invention, the safeguard unit 18 is provided in the industrial robot, having the robot hand 30 attached thereto in the above-mentioned manner, so as to prevent the hand-holding unit 20 of the hand-holding device, the wrist 10, and the robot arm 12 from being damaged, particularly when an extraordinary force is applied to the robot hand 30. The constitution and the function of the safeguard unit 18 is described hereinafter.

Figure 2:
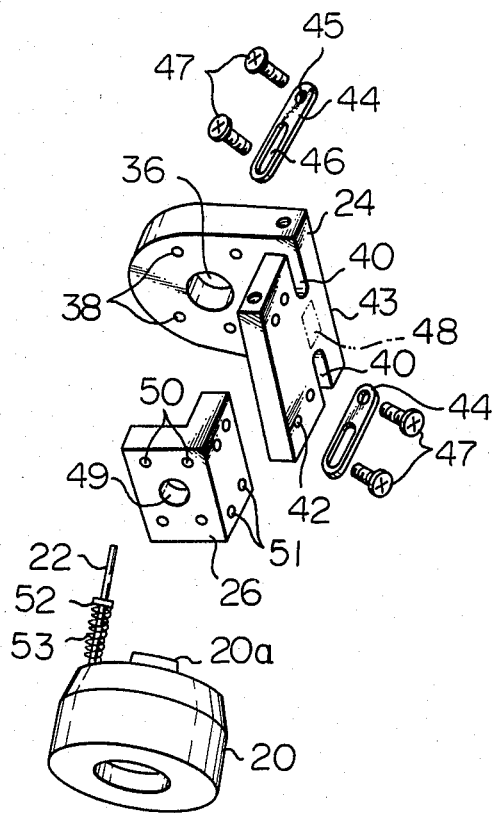
FIG. 2 is an exploded perspective view of a safeguard unit of the hand-holding device of FIG. 1.

FIG. 2 is an exploded perspective view of the safeguard unit 18 and the hand-holding unit 20 of the hand-holding device shown in FIG. 1. Referring to FIG. 2, the safeguard unit 18 has, as mentioned above, the safeguard joint 24 and the attachment joint 26. A hole 36 for receiving the rotary output end 14 of the robot wrist 10 therethrough and holes 38 for fitting fastening screws therethrough are formed in one wall of the safeguard joint 24 while a pair of oppositely extending recesses 40 and a plurality of holes 42 for fitting screws for fastening the safeguard joint 24 and the attachment joint 26 together are formed on its other wall. A narrow part 43 formed between the two recesses 40 is designed to be mechanically broken when the extraordinary force mentioned above exceeds a fixed value. That is, the fixed value is selected so that breaking of only the safeguard joint 24 occurs when the extraordinary force acts on the industrial robot, particularly, the robot hand 30. Safeguard plates 44 are attached to opposite sides of the safeguard joint 24 across the recesses 40. Each safeguard plate 44 is formed of a band member having a round hole 45 and a slot 46. The safeguard plate 44 is fastened to the side of the safeguard joint 24 by screwing in screws 47 through the round hole 45 and the slot 46, respectively. Since the safeguard plates 44 are attached to the safeguard joint 24, the screws 47 are displaced within the corresponding slots 46 so that the falling off of a part of the safeguard joint 24 on the side of the robot hand 30 due to complete fracture of the safeguard joint 24 is prevented, even if the narrow part 43 is broken mechanically, as mentioned above. A strain gauge 48 is affixed to the outside surface or the inside surface of the narrow part 43 of the safeguard joint 24 with suitable sticking agents in order to provide an electric signal when a strain is produced in the safeguard joint 24 due to an extraordinary external force which is less than the extraordinary external force necessary to break the narrow part 43 mechanically.

On the other hand, the attachment joint 26 is formed as a right-angled joint member having an L-shaped cross section and a hole 49 for receiving an upper flange 20a of the hand-holding unit 20 therethrough, and a suitable number of through holes 50 for receiving screws are formed in one wall thereof while threaded holes 51 for fastening the safeguard joint 24 and the attachment joint 26 are formed in the other wall thereof. The attachment joint 26 is fastened to the hand-holding unit 20.

Figure 3:
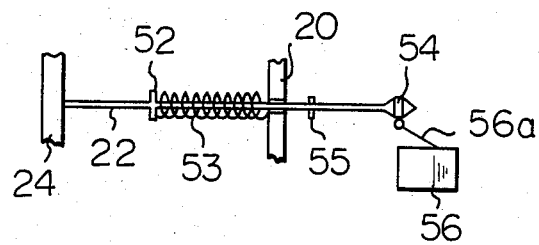
FIG. 3 is a schematic view illustrating the relative arrangement of a breakage-detecting lever and a limit switch to be built into the safeguard unit of FIG. 1.

The lever 22 extending from the hand-holding unit 20 is formed as an elongated rod which can be inserted into the hand-holding unit 20. A spring stopper consisting of a washer and a C-ring or of a suitable flange 52 for stopping a spring 53 is provided in part of the elongate rod extending outside of the hand-holding unit 20. When the safeguard unit 18 is disposed between the rotary output end 14 of the robot wrist 10 and the hand-holding unit 20, the lever 22 is pushed into the hand-holding unit 20 and the spring 53 is compressed so that a spring force is applied to the lever 22. When mechanical breakage occurs in the narrow part 43 of the safeguard joint 24 and the safeguard joint 24 fractures while being held by the safeguard plates 44, the distance between the safeguard joint 24 and the hand-holding unit 20 changes so that the lever 22 is pressed outward by the spring 53. Consequently, as is shown in FIG. 3, the inner end of the lever 22 is separated from a limit switch 56 within the hand-holding unit 20 so that the limit switch 56 is turned off. A switch-operating piece 54 associated with an actuator 56a of the limit switch 56 is provided at the inner end of the lever 22. While in the normal state of assembly, in which the spring 53 is compressed by the lever 22 between the safeguard joint 24 and the hand-holding unit 20 as shown in FIG. 1, the switch-operating piece 54 is engaged with the actuator 56a of the limit switch 56 so as to turn on the limit switch 56. When mechanical breakage occurs in the safeguard joint 24, as described hereinbefore, the outward movement of the lever 22 causes the switch-operating piece 54 to separate from the actuator 56a and thereby the limit switch 56 is turned off. Thus, breakdown is detected by the change of the limit switch 56 from the turned on state to the turned off state. Reference numeral 55 designates a stopper provided on the lever 22.

Figure 4:
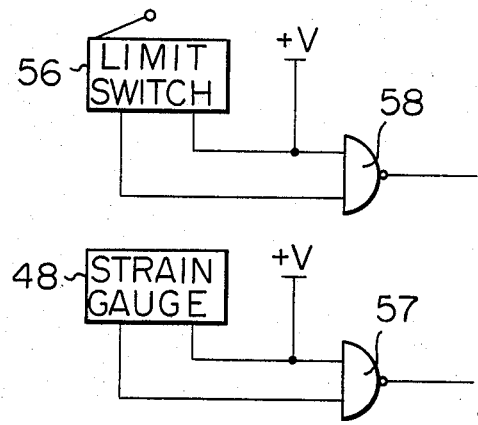
FIG. 4 is a schematic circuit diagram illustrating an example of an abnormal force-and-breakage detection circuit to be incorporated into the hand-holding device according to the present invention.

As described hereinbefore, according to the present invention, the safeguard unit 18 is arranged between the robot wrist 10 of an industrial robot and the hand-holding unit 20 of the hand-holding device. Therefore, breakdown or malfunction of the hand-holding unit 20 forming the essential component of the hand-holding device, the wrist 10, or the robot arm 12 is prevented even if an extraordinary external force acts on the hand-holding device directly or through the robot hand 30 mounted on the hand-holding unit 20. If an extraordinary external force is applied to the safeguard unit 18 and the strain gauge 48 detects an extraordinary external force of a comparatively low level, a logical circuit element 57, shown in FIG. 4, generates a warning signal in response to a detection signal provided by the strain gauge 48. When the safeguard joint 24 is broken and the limit switch 56 is changed from the turned on state to the turned off state due to an extraordinary external force of a comparatively high level, another logical circuit element 58 (FIG. 4) generates a warning signal. Then the control unit of the industrial robot causes, through the robot hand 30, the working unit of the robot, including the robot arm 12, to be moved to a safe position or brings all the driving sources of robot motion to an emergency stop so that such breakage or breakdown as mentioned above is avoided.

In the embodiment of the present invention as described hereinbefore the safeguard joint 24 of the safeguard unit 18 is affixed to the robot wrist 10 and the attachment joint 26 of the same is affixed to the hand-holding unit 20, that is, the safeguard unit 18 of the hand-holding device is held generally by the robot wrist 10. However, it should be understood that the robot hand-holding device having a safeguard unit, which is the gist of the present invention, can be realized by affixing the safeguard joint 24 to the hand-holding unit 20 and the attachment joint 26 to the robot wrist 10. Furthermore, since the strain gauge 48 employed in the embodiment described hereinbefore is provided to sense an extraordinary force of a fixed level, the same effect can be brought about by a similar electric sensing element or an accelerometer. The limit switch 56 may be replaced with other detecting elements, for example, with an electromagnetic relay. Still further, the strain gauge 48 and the limit switch 56 are employed in the described embodiment to detect the action of extraordinary external forces in two steps. However, the strain gauge 48 may be omitted if necessary.

We claim:

1. An industrial robot hand-holding device including a hand-holding unit attached to the extremity of a robot wrist or robot arm of an industrial robot, a hand-attaching unit having mounted thereon a robot hand and being attached to the hand-holding unit, and safeguard unit means arranged between said extremity of said robot wrist or robot arm and said hand-holding unit for effecting a safeguarding action in response to an abnormal force applied to said robot hand, said safeguard unit means comprising:

safeguard joint means formed as a right-angled member having one wall connected to said extremity of said robot wrist or robot arm and another wall extending parallel with and offset from a common axis of said extremity, hand-holding unit, hand-attaching unit and robot hand, said other wall of said safeguard joint means being provided with a pair of oppositely extending recesses therein which define therebetween a dimensionally narrowed part of said other wall which is designed to be broken when said abnormal force applied thereto reaches a predetermined magnitude;

attachment joint means formed as a right-angled member having one wall connected with said hand-holding unit and another wall extending parallel with and offset from said common axis of said extremity, hand-holding unit, hand-attaching unit and robot hand;

means fastening said other wall of said safeguard joint means to said other wall of said attachment joint means;

safeguard plate means attached to at least one side of said other wall of said safeguard joint means across at least one of said pair of oppositely extending recesses therein so as to prevent separation of said safeguard joint means upon breakage of said dimensionally narrowed part thereof;

means for sensing mechanical stress acting on said dimensionally narrowed part of said safeguard joint means, said sensing means issuing an electrical signal proportional to the magnitude of said mechanical stress; and means for detecting breakage of said dimensionally narrowed part of said safeguard joint means and for issuing an electrical signal upon detection of breakage of said dimensionally narrowed part.

* * * * *